United States Patent Office 3,159,569
Patented Dec. 1, 1964

3,159,569
HYDROCRACKING PROCESS AND CATALYSTS
Rowland C. Hansford, Fullerton, Calif., assignor to Union Oil Company of California, Los Angeles, Calif., a corporation of California
No Drawing. Filed Mar. 30, 1961, Ser. No. 99,357
57 Claims. (Cl. 208—110)

This invention relates to method for the catalytic hydrocracking of high boiling hydrocarbon oils to produce therefrom lower boiling fractions such as gasoline or jet fuel. More particularly the invention concerns the use of certain novel catalysts for the hydrocracking, said catalysts being composed of (1) a coprecipitated hydrocracking base comprising silica and one or more of the components, zirconia and titania, and (2) an added heavy metal hydrogenating promoter, all in intimate admixture. Preferably, the catalyst is further activated by the addition thereto of a minor proportion of fluorine or chlorine, either prior to use in hydrocracking, or during the hydrocracking run.

It is a principal object of this invention to provide efficient and selective catalysts for the hydrocracking of mineral oils, which will effect a maximum conversion to high quality gasoline-boiling-range hydrocarbons, and a minimum of destructive degradation to products such as methane and coke. Another object is to provide catalysts which are active at low temperatures, e.g., 400°–700° F. A specific object is to provide catalysts which are effective for the hydrocracking at low temperatures of refractory, high-boiling petroleum fractions, boiling, for example, up to 700°–1,000° F. Still another object is to provide effective promoters for increasing the intrinsic activity of silica-zirconia, silica-titania, or silica-zirconia-titania hydrocracking catalyst, and prolonging the active life thereof. Other objects and advantages will be apparent from the description which follows.

The principal problem in hydrocracking centers around the dilemma of how to make the catalyst work efficiently, i.e., give high conversions per unit of catalyst, without undergoing rapid deactivation by coking and without resorting to expensive, high-pressure processing. Previous attempts to apply hydrocracking have foundered economically upon at least one of these factors.

Most of the previously proposed hydrocracking processes are designed to operate at high pressures, i.e., above 3,000 p.s.i.g. By operating at high pressures, satisfactory catalyst life and efficiency can usually be attained. However, there is a critical economic disparity between operating at 3,000 p.s.i.g. and, for example, at 1,500 p.s.i.g. The costs in plant equipment and utilities for operating at the 3,000 p.s.i.g. level are generally prohibitive under present economic conditions, while an operation conducted at 1,500 p.s.i.g. would be distinctly attractive, provided that commensurate catalyst life and efficiency can be maintained.

Operations conducted at below 2,000 p.s.i.g. immediately encounter the problem of increased deactivation rates resulting from the deposition of coke and other deposits upon the catalyst. The classical solutions to this problem involve either frequent regenerations of the catalyst, or using low temperatures and low space velocities whereby the work load per unit of catalyst is decreased. The latter of these solutions entails a large and generally prohibitive catalyst inventory. The former leads to two other unfeasible alternatives, i.e., the use of moving-bed or fluidized bed techniques, or frequent shut-downs of fixed-bed reactors for regeneration. The moving-bed or fluidized bed techniques are difficult to apply and require expensive equipment when operating at above about 500 p.s.i.g., and it is only at above 500 p.s.i.g. that hydrogen has any significant effect upon the cracking operation. Frequent shut-downs of fixed-bed reactors for regeneration necessitate either duplicate stand-by reactors, or interrupted production, and in any case, each regeneration is an expensive operation.

According to the present invention, the foregoing problems are solved by providing catalysts which are unusually active for hydrogenation (thereby permitting the use of lower pressures without encountering rapid deactivation), and which also display high cracking activity (thereby permitting maximum feed rates and conversions at low, non-coking temperatures).

It is therefore another object of this invention to provide a hydrocracking process which may be carried out entirely at pressures below about 3,000 p.s.i.g., while maintaining a relatively constant and economical conversion level for periods in excess of about three months without catalyst regeneration. And still another object is to provide specific hydrocracking catalysts which are particularly adapted to low pressure, fixed-bed operation, utilizing high-boiling feedstocks.

While the catalysts of this invention are quite active in the absence of added halogen, it has been found that the addition of a halide, particularly fluorine, materially increases their cracking activity, thereby permitting the use of hydrocracking temperatures from 50°–300° F. lower than the temperature required for an equivalent conversion using the non-halided catalysts. This is important from the standpoint of treating high end-point feeds (which tend to deactivate the catalyst more rapidly), and also from the standpoint of obtaining maximum run lengths in operations where the temperature is increased incrementally during the run to maintain constant conversion.

It is known in the art that the cracking activity of alumina-containing hydrocracking catalysts can be increased by the addition of fluorine, which presumably combines with the alumina to form aluminum hydroxyfluorides. The catalysts of this invention however do not contain alumina, and the effect of added fluorine was hence a matter of speculation, both as to its effect on activity and surface area, and as to possible decomposition of the catalyst by the formation of volatile fluorine compounds of silicon, zirconium and/or titanium. It has been found however, that a material increase in activity is obtained without excessive catalyst decomposition.

The hydrocracking base compositions for use herein are composites containing about 5–85% by weight of silica, and coprecipitated therewith between about 15–95% by weight of zirconia, titania, or a mixture of the two. Preferably the silica content is at least about 15% by weight. The two-component composites of silica and zirconia are preferably composed of about 20–70% $SiO_2$ and 80–30% by weight of $ZrO_2$. The two-component silica-titania bases are preferably composed of about 20–70% $SiO_2$ and 80–30% of $TiO_2$.

The preferred hydrocracking bases are those containing all three of the components; e.g., between about 5% and 75% of silica, between about 5% and 75% zirconia, and between about 5% and 75% of titania, by weight. A still further preference is for those bases wherein zirconia and titania comprise the major portion thereof, silica being the minor component. The high-silica base compositions are generally quite heat stable, but those containing more than about 65% by weight of silica are in general less active than those containing lesser proportions. The bases containing less than about 10% of silica may be initially quite active, but are not sufficiently heat stable for some purposes. The optimum proportions of ingredients are roughly equi-molar; i.e., the equi-molar compositions appear to exhibit the optimum combination of activity, selectivity, and heat stability.

The highest activity is generally exhibited by those base compositions containing more than 15% of titania, and more than 15% of zirconia. The greatest heat stability is exhibited by those compositions which contain less than about 65% of titania. For all these reasons the preferred base compositions embrace those falling within the following ranges.

| Component: | Optimum weight percent |
| --- | --- |
| Silica | 10–65 |
| Titania | 15–65 |
| Zirconia | 15–65 |

The active hydrogenating promoters are selected from the heavy metals of the transitional series, i.e., those metals wherein the differentiating electron occurs in the second from the outermost shell. Specifically included are the metals of Group VIB and Group VIII, and especially chromium, molybdenum, tungsten, iron, cobalt, nickel, rhodium, palladium, iridium and platinum. These promoters may be used either in the form of the free metal, or other compounds thereof, particularly the oxides and sulfides, or any mixtures thereof. Suitable proportions may range between about 1% and 35% by weight of the finished catalyst, based on free metal. In the case of the noble metals, e.g., platinum, relatively small amounts are used, e.g., between about 0.1% and 2% by weight. For low pressure operations at below 3,000 p.s.i.g., it is preferred to use larger amounts of the promoters, i.e., for the noble metals between about 0.5% and 2% by weight, and for the non-noble metals, e.g., nickel, cobalt, iron, chromium, molybdenum and tungsten, between about 8% and 30% by weight based on free metal.

The hydrogenating promoter may be added by impregnation of the coprecipitated base (either in the wet or dry state), or it may be coprecipitated, or "coflocculated" with the base components.

Preparation of the catalyst will first be described in reference to coprecipitation, wherein the hydrogenating promoter and the base are simultaneously precipitated and coflocculated. Firstly, an acidic solution is prepared containing acid-soluble compounds of zirconium and/or titanium, and preferably of the hydrogenating promoter. This acidic solution is then mixed with an alkaline solution containing sufficient alkali to precipitate the components of the acid solution. Preferably the alkaline solution also contains dissolved therein an alkali metal silicate, which is precipitated by excess acid contained in the acidic solution. However, the silica component can also be included as an acid-soluble compound in the acidic solution, e.g., silicon halides or fluosilicic acid. In this latter case, the alkaline solution will contain only the alkali required to precipitate the components in the acid solution, and to neutralize any excess acidity. The liquid medium in which precipitation is carried out may be any suitable liquid, but is preferably water. The anion of the catalyst components in solution should be such as will produce a soluble salt with the cation of the alkali employed. In this manner, the coprecipitated components may be filtered off and washed with excess water to remove the contaminating ions.

One exemplary method of effecting coprecipitation involves forming an acidic aqueous solution of fluosilicic acid, zirconyl chloride, titanium tetrachloride and cobalt nitrate as the promoter, and then mixing this solution with a suitable alkali such as ammonium hydroxide or an alkali metal hydroxide to effect a precipitation of the hydrous oxides of all four components. The precipitate is then removed by filtration, washed exhaustively to remove contaminating ions, dried and calcined.

A preferred coprecipitation process involves forming an aqueous solution of sodium silicate containing excess alkali such as ammonium hydroxide or sodium hydroxide, and mixing the alkaline silicate solution with an acidic solution of zirconium sulfate, titanium sulfate and for example nickel sulfate, followed by filtration and washing in the same manner.

One difficulty encountered in coprecipitating the promoter with the base revolves about the removal of contaminating ions such as sulfate, sodium, etc. The silica-zirconia-titania component is zeolitic in nature, and tends to retain rather tenaciously water-soluble cations such as sodium, ammonium, etc. No difficulty is ordinarily presented by ammonium ions since they may be removed easily by volatization during calcining. However, sodium ions are much more difficult to remove and may require extensive washing and ion exchanging with ammonium salts to remove them. These difficulties would of course be resolved if ammonium hydroxide could be used as the precipitating alkali. However, many of the promoter components, e.g., nickel, form water-soluble complexes with ammonia and ammonium salts, with resultant incomplete precipitation of the promoter. For this reason, it has in the past been preferred to use alkali metal hydroxides as the precipitating alkali. This leads directly back to the problem of removing zeolitic alkali metal ions from the catalyst.

The foregoing difficulties may be solved by employing a "delayed coflocculation" method, wherein the base component is separately precipitated with ammonia, and an aqueous solution of the promoter metal is precipitated with an alkali metal hydroxide or ammonium carbonate. The mother liquor from the base precipitation is then removed by decantation or filtration, and the filter cake is washed with water to remove most of the ammonium salts. The separately precipitated promoter may then be slurried with the washed, gelatinous base, resulting in coflocculation. Preferably, the bulk of the alkali metal ions are separated from the precipitated promoter before it is admixed with the gelatinous base, as by decanting the mother liquor and water-washing. However, even when the entire slurry of precipitated promoter is added without removal of alkali metals, substantial benefits accrue, because the final slurry will contain a much lower concentration of alkali metal ions than would be present if alkali metal hydroxide had been used to precipitate all the components. By this novel delayed coflocculation technique, the alkali metal ions needed for adequate precipitation of the promoter need never come in contact with the zeolitic components of the catalyst, and most importantly, ammonium ions are not allowed to come in contact with the promoter, thereby avoiding the formation of soluble complexes. Any remaining zeolitic ammonium ions are easily removed by volatilization during drying and heating of the catalyst. This delayed coflocculation procedure not only avoids the major difficulties in obtaining complete precipitation of promoter and removal of zeolitic cations, but produces a more active catalyst than does coprecipitation.

In the delayed coflocculation procedure, it is desirable to admix the precipitated promoter with the precipitated base before the particle size of the respective precipitates has been allowed to grow substantially. If the gelatinous precipitates are allowed to stand for sufficient time to allow the growth of large micelles, then the subsequent coflocculation will be uneven, and the components will not be sufficiently intimately admixed. It is therefore preferred to admix the two precipitates within about 2 hours of the respective precipitations, depending to some extent upon the temperature. At high temperatures, particle size growth is relatively rapid, while at low temperatures the growth is slower. It is therefore preferred to maintain the respective slurries at room temperature of below, e.g., for about 0° to 30° C., and to decant or filter off the mother liquor from the respective precipitates as rapidly as possible. Preferably, the precipitated promoter is mixed with the precipitated base composite within about 1 hour from the initial precipitation. Coflocculation is facilitated by moderate to vigorous stirring.

An important consideration in preparing the coprecipitated catalysts or catalyst bases of this invention involves the hydrogen ion concentration of the aqueous medium in and surrounding the immediate zone in which the base composite is precipitated. It has been found that when alkaline sodium silicate solutions are stirred gradually into a large volume of acidic titanium and/or zirconium compounds, whereby the precipitation occurs in a predominantly acidic environment, the resulting catalysts are less active than those prepared by gradually stirring the acid salt solutions into a large volume of alkaline silicate. In the latter case, the precipitation occurs in an environment which is largely alkaline. It is therefore preferred that coprecipitation of the base be carried out under conditions such that the major environment is one of alkalinity, i.e., at a pH between about 6 and 12. One method for obtaining alkaline coprecipitation involves adding gradually with stirring an acidic solution of zirconium and/or titanium salts to a larger volume of sodium silicate containing sufficient excess alkali to neutralize the acid salt solution when completely added. However, any other practical method may be utilized which effectively maintains the precipitating environment under alkaline conditions during precipitation. For example, the acidic and alkaline solutions may be mixed simultaneously in a mixing nozzle at appropriate rates to give an alkaline slurry.

It has been found also that the coprecipitated bases prepared from the sulfate salts of zirconium and titanium are somewhat more active than the compositions prepared from the halide salts. It is therefore preferred to utilize the soluble sulfates of zirconium and titanium.

Any suitable soluble salts or hydrosols of silica, zirconium and titanium may be employed in the above preparations. Suitable compounds include for example zirconyl chloride, zirconyl bromide, zirconyl iodide, zirconium sulfate, zirconium acetate, titanium tetrafluoride, titanium tetrachloride, titanium tetrabromide, titanium tetraiodide, titanium sulfate (e.g., $TiOSO_4 \cdot H_2SO_4 \cdot 8H_2O$), titanium oxalate, sodium silicate, potassium silicate, fluosilicic acid, silica hydrosols, and the like. The zirconyl halides listed above may be formed in situ by adding to water the corresponding tetra-halide of zirconium.

In one modification, a mixture of crude silica, titania (rutile or anatase), and zirconia may be digested with hydrofluoric acid until all three components are dissolved, and the resulting solution then neutralized with alkali, thereby precipitating the mixed hydrogels. In another modifications, mixtures of crude titania and zirconia may be digested with acids, e.g., sulfuric or hydrofluoric, until dissolved, and the resulting solution mixed rapidly with a sodium silicate solution containing sufficient excess alkali to neutralize the free acid, thereby precipitating hydrous silica, titania and zirconia.

Suitable promoter salts for addition to the acidic precipitating solution include in general the nitrates, sulfates, acetates, chlorides and the like. Specifically contemplated are nickel sulfate, nickel nitrate, cobalt sulfate, cobalt nitrate, chromic acetate, chromic nitrate, chromic acid, metatungstic acid, ferrous chloride, manganous chloride and the like. In some cases the promoter may be added to the alkaline solution, and suitable salts for this purpose include ammonium molybdate, ammonium tungstate, ammonium chromate and the like.

In addition to ammonia and alkali metal hydroxides, other alkalis may be used to effect the above-described precipitations, particularly of the promoter. The alkali metal or ammonium carbonates, bicarbonates, sulfides and hydrosulfides may also be used, as well as organic bases such as methylamine, dimethylamine and the like. When carbonates or sulfides are used, either alone or in admixture with hydroxides, the promoter will generally be precipitated in the form of a carbonate or sulfide respectively.

When the hydrogenating promoter is to be added by impregnation, the coprecipitated base is prepared by any of the above-described methods, and is then impregnated either in the wet or dry state. When impregnating the final calcined base, it is preferable first to form it into the shape desired for the final catalyst pellet, and then impregnate with an aqueous solution of a salt of the desired promoter, followed by draining, drying, and calcining. The wet gels are ordinarily impregnated prior to the pelleting operation.

For purposes of impregnation, appropriate aqueous or organic solvent solutions of salts of the desired hydrogenating metal or metals are first prepared, and the wet or dry base is then immersed in the solution, allowed to soak for a few minutes, drained and dried. A particularly convenient way to impregnate the catalyst base is to mix the appropriate amount of crystalline metal salt (e.g., $Ni(NO_3)_2 \cdot 6H_2O$) with the wet filtered co-gel base immediately after the final washing step. The mixture is then ground in a suitable mill, such as a ball mill, to produce a homogeneous paste, which may be extruded directly to form pellets, or it may be dried and pelleted in a tableting machine. Final calcining is ordinarily accomplished by heating in air for 3–48 hours at 350°–800° C.

The salts employed for impregnation should preferably be compounds which may be decomposed during calcining to form oxides and/or sulfides. Where sulfides are desired, sulfate salts of the promoter may be employed and the final composition reduced with hydrogen at high temperatures, e.g., 300°–600° C., thereby reducing the sulfates to sulfides. Other salts such as the nitrates, acetates, formates and the like may be employed, which upon calcining are converted to the corresponding oxides. Suitable salts for aqueous impregnation include for example the sulfates, nitrates, acetates, and formates, of cobalt or nickel. Suitable impregnating salts of the noble metal promoters include for example, chloroplatinic acid, soluble amines of platinum chlorides, ammonium chloroplatinate, palladous chloride, rhodium chloride, rhodium nitrate, iridium chloride, iridium sulfate and the like. When a Group VIB metal is employed, aqueous solutions of ammonium paramolybdate, chromic acid, chromium nitrate, chromium acetate, chromium sulfate, ammonium tungstate, uranium sulfate and the like may be employed. When more than one promoter is employed, the appropriate salts may be simultaneously or alternately impregnated. Where alternate impregnation is employed, it is preferable to dry and/or calcine the catalyst between the separate impregnation steps.

Where halogen is to be added to the catalyst, it is normally added after the incorporation of all other components, though this is not always essential. The halogen may be added in the form of hydrofluoric acid, elemental fluorine, silicon tetrafluoride, fluosilicic acid, sulfur hexafluoride, boron trifluoride, or any of various organic fluoro compounds such as benzotrifluoride, isopropyl fluoride, tert-butyl fluoride, perfluoro-cyclohexane, dichlorodifluoromethane and the like. The corresponding chloro compounds may also be used, but to less advantage. Normally it is preferable to add the halogen compound under substantially anhydrous conditions in the vapor phase, although hydrofluoric acid and fluorosilicic acid can be added by aqueous impregnation if desired. The complex fluoro-compounds (i.e., compounds other than HF or $F_2$) are preferably added at relatively high temperatures of 200°–900° F. in admixture with hydrogen. In the case of the organic fluoro compounds, the temperature should be sufficiently high (e.g., 400°–900° F.) to effect decomposition, with resultant formation of HF. The treatment is continued until the desired amount of halogen, usually about 0.2–25% by weight, becomes combined with the catalyst. Preferred amounts are between about 2–15%.

The halogen may be added initially, before the catalyst is placed on-stream, or it may be added intermittently or continuously during the hydrocracking run. Normally, some halogen is lost during hydrocracking, and it is desirable to maintain the halogen content by including a suitable halogen compound in the feed, or the recycle gas.

A particularly active and preferred form of halogenated catalyst is found to result from the addition of silicon tetrafluoride, either initially following calcining of the catalyst, and/or during the hydrocracking run. It is found that the silicon tetrafluoride-treated catalysts are not only remarkably active, but that they are unusually stable. A substantially constant silica and fluorine content may be maintained in the catalyst by the continuous or intermittent injection of silicon tetrafluoride with the feed.

It is found also that, when using silicon tetrafluoride in the feed, the improved activity resulting therefrom can be maintained at a substantially constant level for very long periods of time by including small amounts of water, e.g., 10–500 parts per million, in the feed. The water may be added as such, or in the form of a precursor thereof, such as carbon dioxide, methanol, ethanol, butanol, etc.

In any of the above preparation methods, the catalyst may be formed into pellets or granules at various stages in the manufacture. The moist powders may be compressed or extruded to form pellets prior to calcining, or the calcined, powdered gels may be compressed to form the desired pellets. Ordinarily it is desirable to employ the catalyst in the form of pellets or granules ranging in size from about 1/16-inch to 1/2-inch in diameter. In forming such pellets it may be desirable to employ minor proportions of binders such as hydrogenated corn oil or the like, and in case the dry materials are to be pelleted, a small proportion, e.g., 1–2% by weight, of graphite may be incorporated therein to act as a lubricant. The binders and lubricants, if employed, are removed by combustion during the final calcining. Those skilled in the art will readily appreciate that other compounding and pelleting procedures may be employed.

The above catalysts may be utilized for hydrocracking a great variety of mineral oil feedstocks, which are generally high boiling fractions derived from petroleum stocks, shale oils or tar sands. The catalysts are especially useful for hydrocracking coker gas oils, refractory cycle stocks from conventional cracking operations, or alternatively they may be used for hydrocracking virgin gas oils to prevent the buildup of refractory residues from the cracking operation. Any of these feedstocks may also contain organic sulfur in amounts up to about 4% by weight, and organic nitrogen in amounts up to about 2% by weight. In the hydrocracking process these sulfur and nitrogen compounds are largely decomposed. In the case of halogenated catalysts however, the feed should be substantially free of nitrogen compounds, i.e., the nitrogen content should be below about 0.001%. The halogenated catalysts are especially useful for the treatment of heavy feeds, having an end-boiling-point above about 650° F., for example.

The hydrocracking conditions employed herein involve passing the vaporized hydrocarbons over the finished catalyst at temperatures ranging between about 400° and 900° F. (preferably between 450° and 850° F.), hydrogen pressures above about 100 p.s.i.g., preferably between about 500 and 5,000 p.s.i.g., and space velocities ranging between about 0.1 and 10.0. In the case of the halogenated catalysts, hydrocracking temperatures in the lower range of about 400°–700° F. are preferred; for the non-halogenated catalysts, the preferred temperature range is between about 650° and 850° F.

After long periods of use, the catalysts may decline in activity to an undesirable level as a result of coke deposits and other inactivating factors associated with the hydrocracking process. When this occurs, the catalysts may be restored substantially to their initial activity by oxidative regeneration, as by heating in the presence of air, or air-flue gas mixtures at 350°–800° C. for 3 to 48 hours. In the case of halogenated catalysts the regeneration will normally remove most or all of the halogen, and hence it may be desirable to replace the halogen after regeneration.

The following examples are cited to illustrate the effectiveness of the herein described catalysts for hydrocracking but such examples should not be construed as limiting in scope:

EXAMPLE I

A series of coprecipitated base catalysts, each containing silica and one or more of the components zirconia, and titania was prepared by neutralizing ammoniacal sodium silicate solutions with appropriate proportions of acidic solutions containing varying proportions of zirconium sulfate $(Zr(SO_4)_2 \cdot 4H_2O)$, or titanium tetrachloride, or both. The method of precipitating involved adding the acidic zirconium and/or titanium solution gradually with stirring to the ammoniacal sodium silicate solution containing sufficient ammonia to neutralize the acidic salt solution when completely added. The resulting coprecipitation occurred at a pH ranging from about 12 to 6. Other catalysts were prepared by the reverse order of addition with results as indicated below.

The mixed hydrogels from the above coprecipitations were filtered from the solutions, partially dried, washed with an aqueous ammonium sulfate solution to remove zeolitic sodium, washed with water until free of sulfate, dried, pulverized and formed into 1/8" pellets. The pellets were then calcined at 900° F. for 18 hours.

Pure zirconia and titania gels were prepared by precipitation with ammonia from aqueous solutions of zirconyl chloride or titanium tetrachloride, followed by washing, drying and calcining.

The catalysts prepared as outlined were then tested for hydrocracking activity employing a refractory cycle stock from a commercial catalytic cracking operation, and having the following characteristics:

API gravity at 60° F. _____degrees__ 21.3
ASTM distillation end-point _____° F__ 673
Wt. percent sulfur _____ 0.92
Wt. percent nitrogen _____ 0.14
Vol. percent aromatics _____ 62
Vol. percent saturates _____ 33

The processing conditions employed were as follows:

Temperature _____° F__ 900
Pressure _____p.s.i.g__ 1,000
LHSV _____ 0.5
$H_2$/liquid feed _____s.c.f./bbl__ 8,000
Length of runs _____hours__ 6

The results of the various runs were as follows:

TABLE 1

| Catalyst No. | Composition, Wt. Percent | | | Gasoline Yield, Vol. percent of feed | | Average Selectivity [3] |
|---|---|---|---|---|---|---|
| | $SiO_2$ | $ZrO_2$ | $TiO_2$ | Avg.[1] | Max.[2] | |
| 1 | 0 | 100 | 0 | 19 | 21 | 64 |
| 2 | 10 | 90 | 0 | 35 | 36 | 77 |
| 3 [4] | 20 | 80 | 0 | 37 | 39 | 67 |
| 4 | 20 | 80 | 0 | 40 | 51 | 76 |
| 5 [4] | 20 | 70 | 10 | 28 | 28 | 95 |
| 6 | 20 | 70 | 10 | 41 | 48 | 83 |
| 7 | 20 | 60 | 20 | 55 | 72 | 80 |
| 8 | 20 | 50 | 30 | 59 | 74 | 85 |
| 9 | 20 | 40 | 40 | 53 | 74 | 68 |
| 10 | 20 | 30 | 50 | 49 | 70 | 76 |
| 11 | 20 | 20 | 60 | 67 | 71 | 81 |
| 12 | 20 | 10 | 70 | 37 | 61 | 57 |
| 13 | 20 | 0 | 80 | 59 | 76 | 78 |
| 14 | 10 | 0 | 90 | 54 | 65 | 78 |
| 15 | 0 | 0 | 100 | 25 | 34 | 80 |
| 16 | 50 | 30 | 20 | 43 | 56 | 77 |

[1] Average for full six-hour run.
[2] Product from first hour of run.
[3] Selectivity = $\frac{\text{Vol. \% gasoline yield}}{100-\text{Vol. \% liquid residue}} \times 100$.
[4] Catalysts coprecipitated over pH range from about 0 to 7; others coprecipitated over range from about 12 to 6.

From the foregoing data it will be apparent that the unpromoted three-component catalysts 5 through 12, and 16, are in general substantially more active than either the single-component or the two-component silica-zirconia catalysts, in terms of average gasoline yields.

Catalysts No. 13 and 14, while initially quite active, are definitely inferior to the three-component catalysts 6 to 11 in terms of thermal stability. Catalysts 6 to 11 showed by differential thermal analysis, major transition points in the temperature range of 1,324° to 1,530° F., while No. 13 showed a major transition point at only 1,121° F., and No. 14 showed no distinct transition point, crystallization occurring evenly over a broad temperature range. The addition of zirconia hence provides a definite improvement in thermal stability.

All of the foregoing catalysts are substantially improved in activity by the addition of a hydrogenating promoter such as nickel or platinum. By adding both a hydrogenating promoter (e.g., 5% Ni) and fluorine (e.g., 5% F added as $SiF_4$), the activities are even further improved, though it is definitely preferable in this case to reduce the nitrogen content of the feed to below about 10 parts per million. When this is done however, the objection to catalysts 6 and 11 on thermal instability is largely obviated because equivalent conversions can be obtained at about 500–550° F.

EXAMPLE II

A portion of the 30% $TiO_2$, 50% $ZrO_2$, 20% $SiO_2$ base, identical to catalyst No. 8 of Example I, was employed to prepare a series of promoted catalysts by impregnation with various metal salts as follows:

Catalyst No. 17 was prepared by impregnating the calcined base with aqueous nickel sulfate, followed by draining, drying and hydrogen reduction at 400° C. for about 4 hours, to give a final catalyst containing 1.1% by weight of NiS.

Catalyst No. 18 was prepared in the same manner as No. 17, substituting cobalt sulfate for the nickel sulfate, to give a final catalyst containing 1.1% CoS.

Catalyst No. 19 was prepared by impregnation with aqueous ammonium paramolybdate, followed by calcining in air to give a final catalyst containing 1.2% of molybdenum oxide, calculated as $MoO_3$.

Catalyst No. 20 was prepared in the same manner as No. 19, substituting ammonium tungstate for the molybdate solution, to give a final catalyst containing 1.2% tungsten oxides calculated as $WO_3$.

Catalyst No. 21 was prepared by impregnation with an aqueous solution of chromic acid, followed by calcining in air to give a final catalyst containing 1.1% chromium oxide, calculated as $Cr_2O_3$.

Catalyst No. 22 was prepared by alternate impregnation with cobalt nitrate and ammonium paramolybdate solutions, followed by calcining in air to give a final catalyst containing cobalt and molybdenum corresponding to 0.5% CoO and 0.5% $MoO_3$.

Catalyst No. 23 was prepared in the same manner as No. 22 using stronger impregnating solutions, to obtain a final catalyst containing the equivalent of 2.7% CoO and 7.3% $MoO_3$.

Each of the foregoing catalysts was then compared in hydrocracking activity with the base catalyst No. 8, employing the same feedstock as in Example I. The hydrocracking conditions were as follows:

Temperature _____° F__  845
Pressure _____p.s.i.g__ 1,500
LHSV _____  1.0
$H_2$/liquid feed_____s.c.f./bbl__ 4,000

The products were analyzed after 1 hour and after 4 hours of processing, the 4-hour product representing substantially the steady-state activity of the catalyst. The results were as follows:

TABLE 2

| Catalyst No. | Promoter | Gasoline Yield, $C_4$–400° F., Vol. Percent of Feed | | Research Octane No. Clear |
|---|---|---|---|---|
| | | 1-Hr. Product | 4-Hr. Product | |
| 8 | None | 55 | 36 | 87.5 |
| 17 | 1.1% NiS | 75 | 50 | 86.0 |
| 18 | 1.1% CoS | 74 | 50 | 87.0 |
| 19 | 1.2% $MoO_3$ | | 57 | 82.0 |
| 20 | 1.2% $WO_3$ | | 43 | 84.9 |
| 21 | 1.1% $Cr_2O_3$ | | 43 | 85.8 |
| 22 | 0.5% CoO / 0.5% $MoO_3$ | 74 | 50 | 86.6 |
| 23 | 2.7% CoO / 7.3% $MoO_3$ | 55 | 43 | 76.0 |

From the above data, it is clear that the promoted catalysts are more active than the unpromoted catalysts.

EXAMPLE III

Catalyst No. 17 above (1.1% NiS) was employed for hydrocracking the feedstock at 3,000 p.s.i.g., 850° F., 1 LHSV, and with 4,000 s.c.f. of hydrogen per barrel of feed, said conditions being designed to permit continuous, non-regenerative operation. The gasoline yield after 4 hours was 50%, and after 38 hours was 50%, showing no decline in catalyst activity.

EXAMPLE IV

This example demonstrates the critical range of $SiO_2$ content in the catalyst.

A series of catalysts of varying $SiO_2$ ratio, but substantially constant $ZrO_2$/$TiO_2$ ratio, were prepared and tested for hydrocracking a mixture of light catalytic cracking cycle oils, the mixture having a gravity of 23.7° API, an end-point of 657° F. and an acid-solubles content of 58%. The hydrocracking conditions were:

Temperature _____° F__  850
Pressure _____p.s.i.g__ 3,000
LHSV _____  2.0
$H_2$/oil _____s.c.f./bbl__ 8,000

The results were as follows:

TABLE 3

| Catalysts [a] | | Hours on Stream | Vol. Percent Conversion | Percent $C_4^+$ Gasoline [b] | Research Octane No. | |
|---|---|---|---|---|---|---|
| No. | Composition, Wt. Percent | | | | Clear | +3 ml. TEL |
| 28 | 20 $SiO_2$-50$ZrO_2$-30$TiO_2$ | 20 | 49.4 | 56.5 | 83.4 | 94.6 |
| 29 | 30 $SiO_2$-42$ZrO_2$-28$TiO_2$ | 26 | 40.7 | 46.7 | 85.6 | 96.3 |
| 30 | 50 $SiO_2$-30$ZrO_2$-20$TiO_2$ | 18 | 29.7 | 32.6 | 85.3 | 94.6 |
| 31 | 75 $SiO_2$-15$ZrO_2$-10$TiO_2$ | 23 | 16.5 | 17.6 | 84.7 | 93.9 |
| 32 | (20 $SiO_2$-50$ZrO_2$-30$TiO_2$) 1.2 Ni | 18 | 54.3 | 63.1 | 83.0 | 94.6 |
| 33 | (30 $SiO_2$-42$ZrO_2$-28$TiO_2$) 1.0 Ni | 28 | 58.0 | 69.4 | 84.7 | 96.8 |
| 34 | (50 $SiO_2$-30$ZrO_2$-20 $TiO_2$) 1.0 Ni | 20 | 52.7 | 60.5 | 85.3 | 97.3 |
| 35 | (75 $SiO_2$-15$ZrO_2$-10$TiO_2$) 1.1 Ni | 26 | 23.7 | 25.5 | 84.2 | 94.9 |

[a] Catalysts prepared by coprecipitation of $SiO_2$·$ZrO_2$·$TiO_2$ from ammoniacal sodium silicate and $Zr(SO_4)_2$·$TiOSO_4$ solutions. Calcined base impregnated with nickel nitrate and recalcined.
[b] Volume percent of cycle oil feed.

From the above data, it will be apparent that 50% is about the maximum SiO2 content for the unpromoted catalysts 28–31, if maximum activity is desired. For the promoted catalysts 32–35, a considerably larger proportion of SiO2 is permissible, ranging up to about 75%, but for acceptable activity about 65% is the top limit.

EXAMPLE V

This example illustrates the utility of the catalysts for hydrocracking at relatively low temperatures and pressures and high space velocities. The respective catalyst bases were prepared by coprecipitation at pH 8.5 or 5.0, as indicated in Table 5, and then dried, pelleted and calcined. The calcined pellets were then impregnated with the indicated amounts of nickel, and again dried and calcined. The finished catalysts were then tested for hydrocracking at 745° F., 1,500 p.s.i.g. and 4.5 LHSV, using 8,000 s.c.f. of hydrogen per barrel of feed. The feed was a partially hydrogenated, 600° F. end-point coker gas oil having an API gravity of 38.3°, containing 0.0009% nitrogen and less than 0.005% sulfur. The results were as follows:

TABLE 4

| Catalyst | Composition of Base, Wt. Percent | | | pH of Coppt'n. | Wt. Percent NiO | Vol. Percent Conversion to 400° F. E.P. Gasoline |
|---|---|---|---|---|---|---|
| | SiO2 | ZrO2 | TiO2 | | | |
| 36 | 23 | 47 | 30 | 8.5 | 5 | 27.2 |
| 37 | 23 | 47 | 30 | 5.0 | 5 | 26.4 |
| 38 | 23 | 47 | 30 | 8.5 | 13 | 35.3 |
| 39 | 23 | 47 | 30 | 5.0 | 13 | 26.9 |
| 40 | 50 | 20 | 30 | 8.5 | 5 | 25.7 |
| 41 | 50 | 20 | 30 | 5.0 | 5 | 18.4 |

It is again evident that the catalysts coprecipitated at the higher pH are more active than those prepared at the lower pH. However, all the catalysts display a substantial desirable hydrocracking activity.

By impregnating the above catalysts with aqueous hydrofluoric acid to incorporate 4% by weight of fluorine therein, the respective activities of the above catalysts are markedly improved, so that roughly the same conversions noted above are obtained at temperatures of 550°–600° F.

EXAMPLE VI

This example compares the intrinsic activities of catalysts prepared by a single coprecipitation, as compared to coprecipitation of the base followed by impregnation.

(A) *Preparation of Impregnated Catalysts (Nos. 42–46)*

Several coprecipitated hydrocracking bases were first prepared containing various SiO2/ZrO2/TiO2 proportions. In each case the coprecipitation technique consisted in mixing an ammoniacal sodium silicate solution with an acidic solution containing zirconium sulfate $$(Zr(SO_4)_2 \cdot 4H_2O)$$

and titanium sulfate (TiOSO4), the proportions of ingredients being such as to yield the desired proportions of SiO2, ZrO2 and TiO2 in the final catalyst. The method of mixing involved flowing separate streams of the two solutions into a small mixing vessel with vigorous stirring, and allowing the resulting slurry to overflow into a larger holding tank. The rate of flow of the two solutions was controlled so that coprecipitation occurred at a relatively constant pH of about 10.5. The mixed hydrogel was then filtered off, partially dried, washed with aqueous ammonium sulfate to remove zeolitic sodium, washed with water until free of sulfate, dried, pulverized and formed into 1/8" pellets. The pellets were then calcined at 500° C.

The pelleted bases were then impregnated with aqueous nickel nitrate solutions of strength sufficient to deposit about 4.2% of NiO on the final compositions. The respective catalysts were dried and calcined at 500° C. for 12 hours, and are designated below as catalysts 42–46.

(B) *Preparation of Coprecipitated Catalysts 47–51*

These catalysts were prepared by the same coprecipitation technique employed in part A for preparing the respective bases for catalysts 42–46, except that sufficient nickel nitrate was added to the acidic Zr-Ti solution to provide about 4.2% of NiO in the finished catalyst, and the sodium silicate solution contained added sodium hydroxide instead of ammonia. Coprecipitation again occurred at a pH of about 10.5, and the partially dried catalysts were washed with water and ammonium sulfate solutions to remove sodium ions. The washed composites were then dried, pelleted and calcined at 500° C. for 12 hours.

The foregoing catalysts were then tested for hydrocracking activity, using a catalytic cracking cycle oil feedstock boiling between about 400° and 650° F., and having an API gravity of about 24° and an aromatics content of about 52 volume percent. All runs were carried out at 840° F., 3,000 p.s.i.g., 8,000 s.c.f. of hydrogen per barrel of feed, and 2 liquid hourly space velocity. The results were as follows:

TABLE 5.—NICKEL IMPREGNATED

| Catalysts | | | | | Activity Test Data | | |
|---|---|---|---|---|---|---|---|
| No. | Composition, Wt. Percent | | | | Vol. Percent Conversion | Octane Number [a] | |
| | SiO2 | ZrO2 | TiO2 | NiO | | F-1 Clear | F-1 +3 ml. TEL |
| 42 | 19.2 | 47.9 | 28.7 | 4.2 | 50.1 | 80.0 | 92.8 |
| 43 | 28.9 | 40.2 | 26.7 | 4.2 | 67.7 | 80.5 | 92.8 |
| 44 | 38.2 | 34.8 | 22.8 | 4.2 | 60.6 | 82.0 | 94.1 |
| 45 | 47.9 | 29.0 | 19.0 | 4.1 | 50.8 | 81.3 | 93.4 |
| 46 | 71.9 | 14.4 | 9.6 | 4.1 | [b] 20.2 | | |

NICKEL COPRECIPITATED

| 47 | 19.2 | 47.9 | 28.7 | 4.2 | 63.8 | 80.7 | 92.9 |
| 48 | 28.8 | 40.1 | 26.7 | 4.4 | 75.5 | 82.1 | 94.0 |
| 49 | 38.1 | 34.7 | 22.8 | 4.4 | 74.2 | 83.5 | 95.0 |
| 50 | 48.0 | 29.0 | 19.0 | 4.0 | 83.4 | 82.0 | 94.4 |
| 51 | 71.6 | 14.4 | 9.6 | 4.4 | 69 | 82.9 | 94.5 |

[a] Octane Number of C6–415° F. gasoline.
[b] Hydrocracking temperature was 850° F.

The superior activity of the coprecipitated catalysts 47–51 is clearly evident, especially with respect to the compositions containing large amounts of SiO2. A similar superiority is exhibited in the case of corresponding catalysts containing mole-equivalent proportions of the oxides or sulfides of cobalt, chromium, molybdenum or tungsten.

It is not to be presumed however, that the promoter-coprecipitated catalysts are always superior in all respects to the impregnated catalysts. For example, the impregnated catalysts prepared by pulping the wet coprecipitated base with a soluble salt of the desired promoter, and extruding and drying the pulped mass, are generally superior to the promoter-coprecipitated catalysts from the standpoint of resistance to deactivation by coking. This resistance to deactivation by coking is a particularly desirable feature where the catalyst is to be further activated by the addition of a halide.

EXAMPLE VII

This example demonstrates the improved activity of the catalysts containing large amounts of promoter.

One catalyst (No. 52) containing about 13% NiO, 20% SiO2, 41% ZrO2 and 26% TiO2 was prepared by coprecipitation of all four components at a constant pH of about 7.3. The technique consisted of simultaneously mixing separate streams of an acidic solution containing appropriate quantities of zirconium sulfate, titanium sulfate and nickel sulfate, with an alkaline solution containing the appropriate quantities of sodium silicate and of sodium hydroxide to neutralize the acid salt solution. The resulting slurry was filtered, dried, washed free of salts and ion-exchanged with ammonium sulfate solution to remove zeolitic sodium. The product was then dried, pelleted and calcined at 940° F.

Another catalyst (No. 53) was prepared in an analogous manner, with the proportions of ingredients being adjusted so as to give a final catalyst containing 22% NiO, 36% $ZrO_2$, 21.5% $TiO_2$ and 20.5% $SiO_2$.

Each of the foregoing catalysts was then tested for the hydrocracking of a partially hydrofined blend of coker distillate gas oils, the hydrofined blend having an API gravity of 39.2°, a boiling range (Engler) of 436°–536° F., and an acid-solubles content of 18% by volume. The hydrocracking tests were carried out at 1,500 p.s.i.g. and 4.5 LHSV, with 8,000 s.c.f. of hydrogen per barrel of feed. The average bed temperature was 743° F. in the case of catalyst No. 53 and 760° F. in the case of catalyst No. 52. The results were as follows:

TABLE 6

| Catalyst No. | Vol. Percent of Feed Converted to 400° F. End-Point Gasoline | |
|---|---|---|
| | After 2 hours | After 16 hours |
| 52 (13% NiO) | 46.6 | 42.2 |
| 53 (22% NiO) | 66.0 | 64.4 |

Thus, it is evident, especially in view of the lower temperature employed for the 22% NiO catalyst, that its activity is much higher than the 13% NiO catalyst.

Essentially the same differential activities are exhibited by corresponding catalysts wherein the NiO is replaced with mole-equivalent proportions of CoO, $MoO_3$, $Cr_2O_3$, $WS_3$, FeO or $MnO_2$. The general activity levels, however, are somewhat lower than those of the NiO catalysts, since nickel is a more active hydrogenation catalyst.

EXAMPLE VIII

This example demonstrates the superior activity of the catalysts prepared by delayed coflocculation, as compared to coprecipitation.

(A) A coprecipitated catalyst (No. 53) was prepared by the procedure of Example VII, the proportions of ingredients in the solutions being adjusted to give a final composition containing 6% NiO, 19% $SiO_2$, 44% $ZrO_2$ and 31% $TiO_2$.

(B) A catalyst of the same nominal composition (No. 54) was prepared by delayed coflocculation as follows: The silica-zirconia-titania composite was coprecipitated by mixing a stream of aqueous ammoniacal sodium silicate with a stream of acidic solution containing appropriate quantities of the sulfates of zirconium and titanium. The resulting slurry was filtered and reslurried three times in water. The appropriate quantity of $Ni(OH)_2$ was precipitated from aqueous nickel sulfate solution with sodium hydroxide. The nickel hydroxide slurry was filtered, reslurried in water and refiltered. The two filter cakes were then separately reslurried in water and the two slurries were mixed with vigorous stirring. The coflocculated slurry was then filtered, dried and washed five times with distilled water and twice with 2% ammonium nitrate solution. The final sodium content was about 0.01%. The product was dried, pelleted and calcined at 940° F.

Each of the foregoing catalysts was then tested for hydrocracking activity, using the same feed as in Example VII. The hydrocracking conditions were: Temperature 740° F., pressure 1,500 p.s.i.g., LHSV 4.5, $H_2$/oil ratio 8,000 s.c.f./bbl. The results were as follows:

TABLE 7

| Catalyst | Percent Conversion to 400° F. E.P. Gasoline After— | | | | |
|---|---|---|---|---|---|
| | 8 Hrs. | 10 Hrs. | 12 Hrs. | 14 Hrs. | 16 Hrs. |
| 53 (6% NiO, coppt.) | 43 | 43 | 40 | 39.4 | 40 |
| 54 (6% NiO, delayed coflocculation) | 45.3 | 45 | 44.7 | 46 | 45.3 |

The sustained, superior activity of the catalyst prepared by delayed coflocculation is readily apparent. Essentially the same differential activities are found when the NiO in the above catalysts is replaced by mole-equivalent amounts of CoO, MoO, $Cr_2O_3$, $WS_3$, FeO or $MnA_2$, though the general activity levels are somewhat lower.

EXAMPLE IX

This example provides a direct comparison of the relative activities of fluorided and non-fluorided

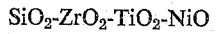

catalysts.

A 20% $SiO_2$, 50% $ZrO_2$, 30% $TiO_2$ hydrocracking base was first prepared by a coprecipitation technique substantially the same as that described in Example VI-A, except that the ammoniacal silicate solution and the acidic Zr-Ti solution were mixed by flowing them into a stirred volume of 1 normal ammonium hydroxide to provide a relatively constant pH of 8–9 during the coprecipitation. A portion of the resulting base was then washed, dried, pelleted, calcined, and then impregnated with a nickel nitrate solution and again calcined to provide 1.5% NiO in the finished catalyst (No. 55).

A 350 gm. portion of the partially dried $SiO_2$-$ZrO_2$-$TiO_2$ base, prepared as described above, was soaked in a solution of 2.7 g. of 48% HF diluted to 300 ml. with distilled water. The product was filtered, dried, pelleted and calcined at 900° F. The calcined pellets were then impregnated with a nickel nitrate solution and again dried and calcined. The final catalyst (No. 56) contained 1.4% NiO and 0.5% F by weight, on a dry basis.

Catalysts Nos. 55 and 56 were then tested for the hydrocracking of a 650° F. end-point fraction of a catalytic cracking cycle oil containing about 0.1% by weight of nitrogen. The hydrocracking conditions were:

Temperature _____° F__ 850–865
Pressure _____p.s.i.g__ 3,000
LHSV _____ 2.0
$H_2$/oil ratio _____s.c.f./bbl__ 8,000

The results were as follows:

TABLE 8

| Catalyst | Temperature, ° F. | Conversion, Vol. Percent | Gasoline Yield, $C_4$-400° F. |
|---|---|---|---|
| 55 (F-free) | 850 | 54.3 | 63.1 |
| 56 (0.5% F) | 865 | 76.7 | 89.0 |

It is thus evident that, even in the presence of nitrogen, the fluorided catalyst was much more active. (Correction of the hydrocracking temperature difference would only reduce the gasoline yield from 89% to 80% for catalyst No. 56.)

With feedstocks free of nitrogen, conversions similar to those shown above are obtained at much lower temperatures, especially in the case of the fluorided catalyst.

EXAMPLE X

A series of hydrocracking runs were carried out, with and without added benzotrifluoride in the feed. The catalyst was a coprecipitated 20% $SiO_2$, 50% $ZrO_2$, 30%

TiO₂ base, upon which was impregnated (by the wet pulping and extruding method described in Example VI) 20% by weight of NiO. The feed was a pre-hydrogenated coker distillate having an end-boiling-point of about 800° F. and containing less than 10 parts per million of basic nitrogen. The runs were all carried out at 1,500 p.s.i.g., 0.8 LHSV, and with 8,000 s.c.f. of hydrogen per barrel of feed, and at temperatures varying between 500 and 550° F. It was found that when the feed contained 0.1% by weight of fluorine as benzotrifluoride, 50–60% conversions to 400° F. end-point gasoline were obtained at temperatures from 200° to 250° F. lower than the temperatures required for equivalent conversions in the absence of benzotrifluoride. Similar differential conversions were obtained after converting the catalyst to a sulfide form by adding thiophene to the feed.

EXAMPLE XI

This example demonstrates the beneficial effect of adding silicon tetrafluoride to the catalyst during the hydrocracking run.

The catalyst was essentially the same as that employed in Example X, and the feed was a pre-hydrogenated 730° F. end-point cracked gas oil containing about 1 part per million of nitrogen and 0.1% sulfur added as thiophene. The run was carried out at 1,500 p.s.i.g., 8,000 s.c.f. of hydrogen per barrel of feed, and 1 LHSV. The temperature was adjusted to maintain a 50% conversion to 400° F. end-point gasoline throughout. The feed throughout contained 300 parts per million of added silicon tetrafluoride and 200 parts per million of water, added as butanol. It was found that, after pre-activation of the catalyst for 50 hours by passing this feed over the catalyst at 554°–652° F., a conversion of 50% was obtained at 640° F. The activity increased with time, requiring a lowering of the temperature to 625° F. to maintain the 50% conversion. The 50% conversion was maintained at the 625° F. temperature level for over 400 hours, indicating that the catalyst had a stable activity after this pre-activation treatment.

In contrast to the foregoing, when the same catalyst is used under these conditions, but without SiF₄ activation, the conversion at 625° F. is substantially nil. When SiF₄ is used in the absence of water, there is a substantial improvement in activity, as compared to the catalyst without SiF₄, but the activity does not appear to remain as constant as when water is also used.

This application is a continuation-in-part of the following applications:

(1) Application Serial No. 22,698, filed April 18, 1960, now abandoned, which in turn is a continuation-in-part of application Serial No. 698,398, filed November 25, 1957, now abandoned, which in turn is a continuation-in-part of application Serial No. 617,222, filed October 22, 1956, and now abandoned;

(2) Application Serial No. 36,125, filed June 15, 1960, which in turn is also a continuation in part of said application Serial No. 698,398; and (3) Application Serial No. 842,567, filed September 28, 1959, now abandoned, which in turn is a continuation-in-part of application Serial No. 617,242, filed October 22, 1956, and now abandoned.

The foregoing description is not intended to be limiting in scope, except where indicated. It is intended to include within the scope of this invention all such modifications and variations from the details described as would be apparent to one skilled in the art. The true scope of the invention is intended to be embraced by the following claims.

I claim:

1. A composite hydrocracking catalyst comprising as the essential active ingredients (1) a major proportion of a hydrocracking base consisting essentially of between about 5% and 75% of titania xerogel, between about 5% and 75% of zirconia xerogel, between about 5% and 85% of silica xerogel; and (2) between about 0.1% and 35%, based on free metal, of an added promoter selected from the class consisting of chromium, molybdenum, tungsten, uranium, the Group VIII metals, and the oxides and sulfides thereof, all of said ingredients being intimatedy composited together.

2. A catalyst as defined in claim 1 wherein said promoter metal is nickel.

3. A process for hydrocracking a high-boiling hydrocarbon to produce lower boiling hydrocarbons which comprises contacting said high-boiling hydrocarbon in the presence of hydrogen and under hydrocracking conditions, with a composite catalyst comprising as the essential active ingredients (1) a major proportion of a hydrocracking base consisting essentially of between about 5% and 75% of titania xerogel, between about 5% and 75% of zirconia xerogel, between about 5% and 85% of silica xerogel; and (2) between about 0.1% and 35%, based on free metal, of an added promoter selected from the class consisting of chromium, molybdenum, tungsten, uranium, the Group VIII metals, and the oxides and sulfides thereof, all of said ingredients being intimately composited together.

4. A process as defined in claim 3 wherein said promoter metal is nickel.

5. A process as defined in claim 3 wherein said high-boiling hydrocarbon comprises a gas oil feedstock containing about 0.001% to 2% by weight of nitrogen.

6. A hydrocracking catalyst comprising as essential active ingredients (1) a major proportion of a hydrocracking base consisting essentially of between about 5% and 75% of titania xerogel, between about 5% and 75% of zirconia ing base consisting essentially of between about 5% and 75% titania xerogel, between about 5% and 75% zirconia xerogel, between about 5% and 85% of silica xerogel, and (2) a minor proportion of a promoter selected from the class consisting of chromium, molybdenum, tungsten, uranium, the Group VIII metals, and the oxides and sulfides thereof, said catalyst having been prepared by coprecipitating the hydrous gels of titania, zirconia, and silica from an aqueous solution under alkaline conditions, drying the resulting mixed gel and impregnating the same with an aqueous solution of a salt of said promoter, and calcining the final composition.

7. A catalyst as defined in claim 6 wherein said promoter metal is nickel.

8. A catalyst as defined in claim 6 wherein said promoter metal is a Group VIII noble metal.

9. A catalyst as defined in claim 6 wherein said promoter metal is platinum.

10. A catalyst as defined in claim 6 wherein said promoter metal is paladium.

11. A process for hydrocracking a high-boiling mineral oil feedstock to produce lower boiling hydrocarbons in the gasoline range which comprises contacting said high-boiling feedstock in the presence of added hydrogen, and under hydrocracking conditions, with a catalyst comprising as essential active ingredients (1) a major proportion of a hydrocracking base consisting essentially of between about 5% and 75% of titania xerogel, between about 5% and 75% of zirconia xerogel, between about 5% and 85% of silica xerogel, and (2) a minor proportion of a promoter selected from the class consisting of chromium, molybdenum, tungsten, uranium, the Group VIII metals, and the oxides and sulfides thereof, said catalyst having been prepared by coprecipitating the hydrous gels of titania, zirconia, and silica from an aqueous solution under alkaline conditions, drying the resulting mixed gel and impregnating the same with an aqueous solution of a salt of said promoter, and calcining the final composition.

12. A process as defined in claim 11 wherein said promoter metal is nickel.

13. A process as defined in claim 11 wherein said promoter metal is a Group VIII noble metal.

14. A process as defined in claim 11 wherein said promoter metal is palladium.

15. A process as defined in claim 11 wherein said promoter metal is platinum.

16. A process for hydrocracking a mineral oil feedstock boiling above the gasoline range to produce gasoline-boiling-range hydrocarbons which comprises contacting said feedstock in the presence of added hydrogen, and under hydrocracking conditions, with a catalyst comprising as essential active ingredients (1) a major proportion of a hydrocracking base consisting essentially of between about 15% and 65% of titania xerogel, between about 15% and 65% of zirconia xerogel, between about 10% and 65% of silica xerogel, and (2) between about 0.1% and 35%, based on the free metal, of a promoter selected from the class consisting of chromium, molybdenum, tungsten, uranium, the Group VIII metals, and the oxides and sulfides thereof, said hydrocracking conditions comprising temperatures between about 450° and 850° F., hydrogen pressures between about 500 and 5,000 p.s.i.g., and space velocities between about 0.1 and 10 volumes of liquid feed per volume of catalyst per hour, said catalyst having been prepared by coprecipitating the hydrous gels of titania, zirconia, and silica from an aqueous solution under alkaline conditions, drying the resulting mixed gel and impregnating the same with an aqueous solution of a salt of said promoter, and calcining the final composition.

17. A process as defined in claim 16 wherein hydrogen pressures between about 500 and 3,000 p.s.i.g. are employed, and said catalyst is maintained continuously onstream without substantial decline in activity for at least several weeks.

18. A process for hydrocracking a high-boiling hydrocarbon to produce lower boiling hydrocarbons which comprises contacting said high boiling hydrocarbon in the presence of added hydrogen, and under hydrocracking conditions, with a catalyst comprising as essential active ingredients (1) a major proportion of a hydrocracking base consisting essentially of between about 5% and 75% of titania xerogel, between about 5% and 75% of zirconia xerogel, between about 5% and 85% silica xerogel, and (2) a minor proportion of a promoter selected from the class consisting of chromium, molybdenum, tungsten, uranium, the Group VIII metals, and the oxides and sulfides thereof, all of said ingredients being incorporated in intimate admixture by a process including coprecipitation from aqueous solution at a pH between about 6 and 12 of said titania, zirconia, and silica components, and intimately distributing said promoter therein.

19. A process for hydrocracking a mineral oil feedstock boiling above the gasoline range to produce gasoline-boiling-range hydrocarbons which comprises contacting said feedstock in the presence of added hydrogen, and under hydrocracking conditions, with a catalyst comprising as essential active ingredients (1) a major proportion of a hydrocracking base consisting essentially of between about 5% and 75% of titania xerogel, between about 5% and 75% of zirconia xerogel, between about 5% and 85% of silica xerogel, and (2) between about 0.1% and 35%, based on the free metal, of a promoter selected from the class consisting of chromium, molybdenum, tungsten, uranium, the Group VIII metals, and the oxdes and sulfides thereof, said hydrocracking conditions comprising temperatures between about 450° and 850° F., hydrogen pressures between about 500 and 5,000 p.s.i.g., and space velocities between about 0.1 and 10 volumes of liquid feed per volume of catalyst per hour, said catalyst having been prepared by coprecipitating the hydrous gels of titania, zirconia, and silica from an aqueous solution and thereafter impregnating the mixed gel with an aqueous solution of a salt of said promoter, and calcining the final composition.

20. A hydrocracking catalyst comprising as essentially active ingredients (1) a major proportion of a hydrocracking base consisting essentially of between about 5% and 75% of titania xerogel, between about 5% and 75% of zirconia xerogel, between about 5% and 85% of silica xerogel, and (2) a minor proportion of a promoter selected from the class consisting of chromium, molybdenum, tungsten, uranium, the Group VIII metals, and the oxides and sulfides thereof, said catalyst having been prepared by coprecipitating the hydrous gels of titania, zirconia, and silica from an aqueous solution and thereafter impregnating the mixed gel with an aqueous solution of a salt of said promoter, and calcining the final composition.

21. A catalyst as defined in claim 20 wherein said promoter metal is nickel.

22. A hydrocracking catalyst comprising as the essential active ingredients (1) a major proportion of a hydrocracking base consisting essentially of between about 5% and 75% of titania xerogel, between about 5% and 75% of zirconia xerogel, between about 5% and 85% of silica xerogel, and (2) between about 1% and 35%, based on the free metal of a promoter selected from the class consisting of iron, cobalt, nickel, chromium, molybdenum, tungsten, uranium, and the oxides and sulfides thereof, said catalysts having been prepared by a method including the steps of admixing and coflocculating in an aqueous medium the coprecipitated hydrous gels of silica, titania, and zirconia with a finely divided hydrous precipitate of an alkaline compound of said promoter metal selected from the class consisting of hydroxides, carbonates and sulfides, separating the resulting coflocculated gel from the aqueous medium and drying and calcining the same.

23. A catalyst as defined in claim 22 wherein said promoter metal is nickel.

24. A catalyst as defined in claim 22 prepared by simultaneously coprecipitating and coflocculating all four of said ingredients in the form of hydrous oxide gels from an aqueous solution, separating the resulting coflocculated gel from the aqueous medium and drying and calcining the same.

25. A catalyst as defined in claim 22 prepared by separately coprecipitating the hydrous oxide gels of silica, zirconia and titania from a first aqueous solution, precipitating said promoter as a hydrous oxide gel from a second aqueous solution, commingling and slurrying said precipitated promoter and said coprecipitated silica-zirconia-titania gel in a third aqueous medium to induce coflocculation of all components, separating the resulting coflocculated gel from the aqueous medium and drying and calcining the same.

26. A catalyst as defined in claim 25 wherein said coprecipitation is carried out by mixing an ammoniacal silicate solution with an acidic solution of zirconium and titanium salts, and wherein the mother liquor from said coprecipitation is separated from the resulting co-gel prior to said coflocculation step, whereby said coflocculation is effected substantially in the absence of dissolved ammonium ions.

27. A process for the manufacture of a catalyst useful in hydrocracking, said catalyst consisting essentially of the components silica, zirconia, titania and a heavy metal hydrogenating promoter selected from the class consisting of iron, cobalt, nickel, chromium, molybdenum, tungsten, uranium, and the oxides and sulfides thereof, which comprises forming an aqueous acidic solution of soluble, base-precipitable compounds of zirconium, titanium and said promoter metal, mixing said acidic solution with an aqueous alkaline solution containing dissolved therein an acid-precipitable compound of silicon and sufficient excess alkali to substantially neutralize said acidic solution and precipitate all four of said components concurrently in the form of a hydrous gel, separating said hydrous gel and washing, drying and calcining the same to form a finished catalyst.

28. A process as defined in claim 27 wherein said mixing is controlled so as to provide a precipitation environment substantially within the pH range 6–12.

29. A process for hydrocracking a high-boiling hydrocarbon to produce lower boiling hydrocarbons which comprises contacting said high-boiling hydrocarbon in the presence of hydrogen and under hydrocracking conditions, with a catalyst comprising as the essential active ingredients (1) a major proportion of a hydrocracking base consisting essentially of between about 5% and 75% of titania xerogel, between about 5% and 75% of zirconia xerogel, between about 5% and 85% of silica xerogel, and (2) between about 1% and 35%, based on the free metal, of a promoter selected from the class consisting of iron, cobalt, nickel, chromium, molybdenum, tungsten, uranium, and the oxides and sulfides thereof, said catalyst having been prepared by a method including the steps of admixing and coflocculating in an aqueous medium the coprecipitated hydrous oxide gels of silica, titania and zirconia with a finely divided hydrous precipitate of an alkaline compound of said promoter metal selected from the class consisting of hydroxides, carbonates and sulfides, separating the resulting coflocculated gel from the aqueous medium and drying and calcining the same.

30. A process as defined in claim 29 wherein said promoter metal is nickel.

31. A process for hydrocracking a mineral oil feedstock boiling above the gasoline range to produce lower boiling hydrocarbons in the gasoline range, which comprises contacting said feedstock in the presence of hydrogen and under hydrocracking conditions, with a catalyst comprising as the essential active ingredients (1) a major proportion of a hydrocracking base consisting essentially of between about 5% and 75% of titania xerogel, between about 5% and 75% of zirconia xerogel, between about 5% and 85% of silica xerogel, and (2) between about 1% and 35%, based on the free metal, of a promoter selected from the class consisting of iron, cobalt, nickel, chromium, molybdenum, tungsten, uranium and the oxides and sulfides thereof, said catalyst having been prepared by simultaneously coprecipitating and coflocculating all four of said ingredients in the form of hydrous oxide gels from an aqueous solution, separating the resulting coflocculated gel from the aqueous medium and drying and calcining the same.

32. A process as defined in claim 31 wherein said coprecipitation is carried out at a pH between about 6 and 12.

33. A process as defined in claim 31 wherein said hydrocracking is carried out at a pressure between about 500 and 3,000 p.s.i.g., and said catalyst contains between about 8% and 30% of said promoter, based on free metal.

34. A process as defined in claim 31 wherein said promoter metal is nickel.

35. A process for hydrocracking a mineral oil feedstock boiling above the gasoline range to produce lower boiling hydrocarbons in the gasoline range, which comprises contacting said feedstock in the presence of hydrogen and under hydrocracking conditions, with a catalyst comprising as the essential active ingredients (1) a major proportion of a hydrocracking base consisting essentially of between about 5% and 75% of titania xerogel, between about 5% and 75% of zirconia xerogel, between about 5% and 85% of silica xerogel, and (2) between about 1% and 35%, based on the free metal, of a promoter selected from the class consisting of iron, cobalt, nickel, chromium, molybdenum, tungsten, uranium, and the oxides and sulfides thereof, said catalyst having been prepared by separately coprecipitating the hydrous oxide gels of silica, zirconia and titania from a first aqueous solution, precipitating said promoter as a hydrous oxide gel from a second aqueous solution, commingling and slurrying said precipitated promoter and said coprecipitated silica-zirconia-titania gel in a third aqueous medium to induce coflocculation of all components, separating the resulting coflocculated gel from the aqueous medium and drying and calcining the same.

36. A process as defined in claim 35 wherein said promoter metal is nickel.

37. A process as defined in claim 35 wherein said coprecipitation is carried out by mixing an ammoniacal silicate solution with an acidic solution of zirconium and titanium salts, and wherein the mother liquor from said coprecipitation is separated from the resulting co-gel prior to said coflocculation step, whereby said coflocculation is effected substantially in the absence of dissolved ammonium ions.

38. A process as defined in claim 35 wherein said precipitation of promoter is carried out by mixing an alkali metal hydroxide with an aqueous solution of a salt of said promoter, and wherein the mother liquor from said precipitation is separated from the precipitated promoter prior to said coflocculation step, whereby said coflocculation is effected substantially in the absence of dissolved alkali metal ions.

39. A process as defined in claim 38 wherein said promoter metal is nickel.

40. A hydrocracking catalyst comprising as essential active ingredients in intimate admixture, (1) a hydrocracking base consisting essentially of between about 15% and 65% of titania xerogel, between about 15% and 65% of zirconia xerogel, between about 10% and 65% of silica xerogel, (2) a minor proportion of a hydrogenating promoter selected from the class consisting of chromium, molybdenum, tungsten, uranium, the Group VIII metals, and the oxides and sulfides thereof, and (3) a minor proportion of an added acidic cracking promoter selected from the class consisting of fluorine and chlorine.

41. A catalyst as defined in claim 40 wherein said promoter metal is nickel.

42. A catalyst as defined in claim 40 wherein said hydrogenating promoter is a Group VIII noble metal.

43. A catalyst as defined in claim 40 wherein said acidic cracking promoter is fluorine.

44. A catalyst as defined in claim 40 wherein said acidic cracking promoter is added to the catalyst by reacting the same with a fluoriding agent from the class consisting of hydrofluoric acid, elemental fluorine, silicon tetrafluoride, fluosilic acid, sulfur hexafluoride, boron trifluoride, and organic fluoro compounds.

45. A catalyst as defined in claim 44 wherein said fluoriding agent is silicon tetrafluoride.

46. A process for hydrocracking a high-boiling mineral oil feedstock to produce lower boiling hydrocarbons, which comprises contacting said high-boiling feedstock in the presence of added hydrogen, and under hydrocracking conditions, with a catalyst comprising as the essential active ingredients (1) a hydrocracking base consisting essentially of a coprecipitated composite of about 5–75% silica, 5–75% zirconia and 5–75% titania, (2) a minor proportion of a hydrogenating promoter selected from the class consisting of chromium, molybdenum, tungsten, uranium, the Group VIII metals, and the oxides and sulfides thereof, and (3) a minor proportion of an added acidic cracking promoter selected from the class consisting of fluorine and chlorine.

47. A process as defined in claim 46 wherein said hydrogenating promoter metal is nickel.

48. A process as defined in claim 46 wherein said hydrogenating promoter is a Group VIII noble metal.

49. A process as defined in claim 46 wherein said acidic cracking promoter is fluorine.

50. A process as defined in claim 46 wherein said acidic cracking promoter is incorporated into the catalyst prior to said hydrocracking by reacting the catalyst with a fluoriding agent from the class consisting of hydrofluoric acid, elemental fluorine, silicon tetrafluoride, fluosilic acid, sulfur hexafluoride, boron trifluoride, and organic fluoro compounds.

51. A process as defined in claim 50 wherein said fluoriding agent is silicon tetrafluoride.

52. A process as defined in claim 46 wherein said acidic cracking promoter is incorporated into the catalyst during said hydrocracking by including with the feed thereto a fluoriding agent from the class consisting of hydrofluoric acid, elemental fluorine, silicon tetrafluoride, fluorosilicic acid, sulphur hexafluoride, boron trifluoride, and organic fluoro compounds.

53. A process as defined in claim 52 wherein said fluoriding agent is silicon tetrafluoride.

54. A process for hydrocracking a mineral oil feedstock boiling above the gasoline range to produce gasoline-boiling-range hydrocarbons which comprises contacting said feedstock in the presence of added hydrogen, and hydrocracking conditions, with a catalyst comprising as essential active ingredients (1) a hydrocracking base consisting essentially of between about 15% and 65% of titania xerogel, between about 15% and 65% of zirconia xerogel, between about 10% and 65% of silica xerogel, (2) between about 0.1% and 35%, based on the free metal, of a hydrogenating promoter selected from the class consisting of chromium, molybdenum, tungsten, uranium, the Group VIII metals, and the oxides and sulfides thereof, and (3) between about 0.2% and 25% by weight of acidic fluorine, said hydrocracking conditions comprising temperatures between about 400° and 700° F., hydrogen pressures between about 500 and 5,000 p.s.i.g., and space velocities between about 0.1 and 10 volumes of liquid feed per volume of catalyst per hour.

55. A process as defined in claim 54 wherein said mineral oil feedstock is a gas oil having an end-boiling-point above about 650° F.

56. A process as defined in claim 54 wherein said acidic fluorine is incorporated by reacting the catalyst with a fluoriding agent from the class consisting of hydrofluoric acid, elemental fluorine, silicon tetrafluoride, fluosilicic acid, sulfur hexafluoride, boron trifluoride, and organic fluoro compounds.

57. A process as defined in claim 56 wherein said fluoriding agent is silicon tetrafluoride, and wherein a small amount of water is included with the feed to said hydrocracking.

References Cited in the file of this patent

UNITED STATES PATENTS

| | | |
|---|---|---|
| 2,154,527 | Pier et al. | Apr. 18, 1939 |
| 2,358,879 | Redcay | Sept. 26, 1944 |
| 2,722,504 | Fleck | Nov. 1, 1955 |
| 2,839,450 | Oettinger | June 17, 1958 |
| 2,911,356 | Hanson | Nov. 3, 1959 |
| 3,053,755 | Hansford et al. | Sept. 11, 1962 |

UNITED STATES PATENT OFFICE
CERTIFICATE OF CORRECTION

Patent No. 3,159,569                            December 1, 1964

Rowland C. Hansford

It is hereby certified that error appears in the above numbered patent requiring correction and that the said Letters Patent should read as corrected below.

Column 1, line 1, for "method" read -- methods --; line 54, for "1.500" read -- 1,500 --; column 5, line 44, for "modifications" read -- modification --; column 12, TABLE 5" first column, line 2 thereof, for "42" read -- 43 --; line 75, for "wtih" read -- with --; column 14, line 17, for "CoO, MoO, $Cr_2O_3$, $WS_3$, FeO or $MnA_2$," read -- CoO, $MoO_3$, $Cr_2O_3$, $WS_3$, FeO or $MnO_2$, --; same column 14, line 41, for "impreg-" read -- impregnated --; column 15, line 34, for "652° F." read -- 562° F. --; column 16, lines 31 and 32, strike out "ing base consisting essentially of between about 5% and 75% titania xerogel, between about 5% and 75% zirconia --; column 17, line 37, after "85%" insert -- of --; line 58, for "oxdes" read -- oxides --; column 21, line 5, before "hydrocracking" insert -- under --.

Signed and sealed this 27th day of April 1965.

(SEAL)
Attest:

ERNEST W. SWIDER                             EDWARD J. BRENNER
Attesting Officer                          Commissioner of Patents